SAMUEL PRENTISS AND GEORGE FLINT, OF DE SOTO, MISSOURI.

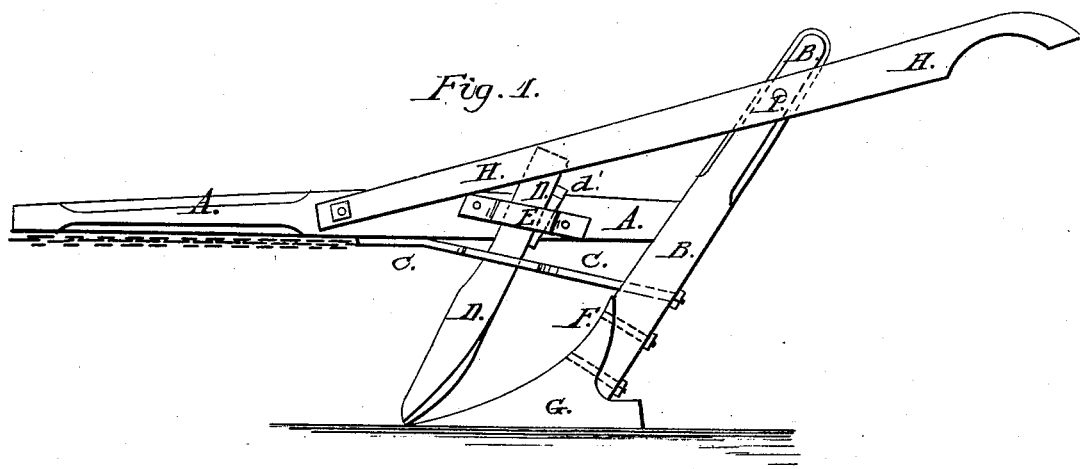
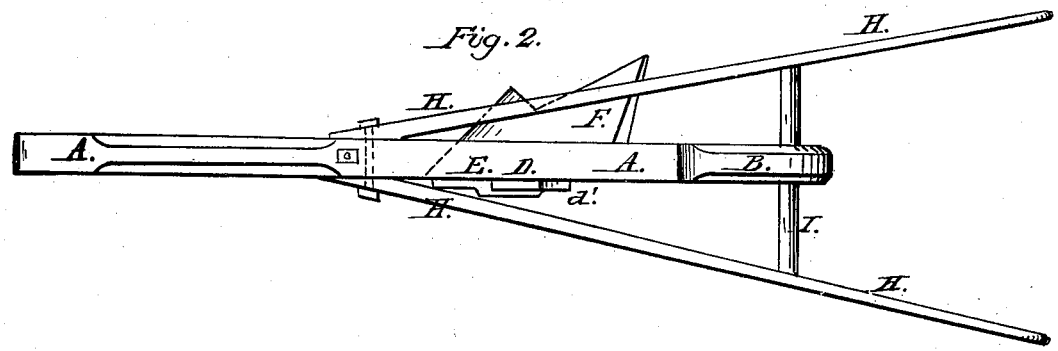

Letters Patent No. 85,851, dated January 12, 1869.

IMPROVEMENT IN PLOWS.

The Schedule referred to in these Letters Patent and making part of the same.

*To all whom it may concern:*

Be it known that we, SAMUEL PRENTISS and GEORGE FLINT, of De Soto, in the county of Jefferson, and State of Missouri, have invented a new and useful Improvement in Plows; and we do hereby declare that the following is a full, clear, and exact description thereof, which will enable others skilled in the art to make and use the same, reference being had to the accompanying drawings, forming part of this specification, in which—

Figure 1 is a view of the landside of our improved plow.

Figure 2 is a top view of the same.

Similar letters of reference indicate like parts.

Our invention has for its object to furnish an improved plow, simple in construction, strong and durable, which may be used with equal facility for breaking up new ground, for plowing old or cultivated ground, or for subsoiling, and which can be run at a greater depth with less draught than is possible with the ordinary plows; and It consists in the arrangement of the brace-bar with relation to the standard, beam, coulter, and draught-chain, and in the general arrangement of parts, as will be hereinafter more fully described.

A is the plow-beam, which is made straight, and to the rear end of which is securely attached the middle part of the standard B, which is set in a somewhat inclined position.

The connection between the standard B and beam A is strengthened by the brace-bar C, the rear end of which is attached to the standard B, and the forward end of which is attached to the beam A, as shown in fig. 1.

The brace-bar C is slotted to receive the shank of the coulter D, the upper end of which passes up through the keeper or strap E, attached to the landside of the beam A, as shown in figs. 1 and 2.

The coulter D is secured in place, when adjusted, by the wedge $d'$, driven in between its edge and the strap or keeper E, as shown in fig. 1.

In plowing old land, or land that has been cultivated, the coulter D need not be used. When the coulter D is used for breaking up new land, we prefer to attach the draught to the forward end of the brace-bar C, by means of a chain running along the under side of the beam A.

When the plow is used for other purposes, the draught is attached to the forward end of the beam A, in the ordinary manner.

F is the mould-board, and G is the land or base-bar of the plow, which parts are made in one piece, or are securely welded together, and are attached to the lower end of the standard B. The mould-board F is made much higher and narrower, with less flare and less wing than is the case with ordinary plows.

This construction adapts it to deep or subsoil plowing, and causes it to encounter less resistance in passing through the ground.

H are the handles, which are made straight, with the exception of the nibs or parts grasped by the hands, which are bent in the ordinary manner.

The forward ends of the handles H are securely attached to the middle part of the beam A, and their rear parts are supported and held in their proper relative position by a cross-bar or round, I, which passes through the upper end of the standard B, and to the ends of which the said handles are attached, as shown in figs. 1 and 2.

Having thus described our invention,

We claim as new, and desire to secure by Letters Patent—

The slotted brace C, arranged, with relation to the beam A, standard B, coulter D, and draught-chain, as herein described, for the purpose specified.

SAMUEL PRENTISS.
GEORGE FLINT.

Witnesses:
O. A. A. GARDNER,
S. J. DAVIS.